US006843484B2

(12) United States Patent
Schroeder

(10) Patent No.: US 6,843,484 B2
(45) Date of Patent: Jan. 18, 2005

(54) QUICK CHANGE CHUCK

(76) Inventor: Monte L. Schroeder, P.O. Box 3707, Mail Stop 13-08, Seattle, WA (US) 98124-2007

( * ) Notice: Subject to any disclaimer, the term of this patent is extended or adjusted under 35 U.S.C. 154(b) by 221 days.

(21) Appl. No.: 10/190,729

(22) Filed: Jul. 8, 2002

(65) Prior Publication Data
US 2004/0004329 A1 Jan. 8, 2004

(51) Int. Cl.[7] ............................................. B23B 31/165
(52) U.S. Cl. ............................. 279/60; 279/58; 279/902
(58) Field of Search ............................... 279/56, 57, 58, 279/59, 63, 70, 902, 60, 61, 64

(56) References Cited

U.S. PATENT DOCUMENTS

| 1,602,708 | A | | 10/1926 | Russell |
| 1,807,265 | A | * | 5/1931 | Walker ........................ 81/53.2 |
| 2,253,345 | A | * | 8/1941 | Palmgren .................... 279/60 |
| 2,350,565 | A | | 6/1944 | Mills |
| 2,544,088 | A | | 3/1951 | Hollis |
| 2,736,562 | A | | 2/1956 | Blackburn |
| 2,807,473 | A | | 9/1957 | Kiehne |
| 2,926,020 | A | | 2/1960 | Dayton et al. |
| 2,987,334 | A | | 6/1961 | Wendling |
| 3,583,715 | A | | 6/1971 | Jahrl |
| 3,652,099 | A | | 3/1972 | Bilz |
| 3,672,692 | A | | 6/1972 | Fauth |
| 4,277,074 | A | | 7/1981 | Kilberis |
| 4,381,116 | A | | 4/1983 | Futter |
| 4,527,809 | A | | 7/1985 | Umbert |
| 4,594,036 | A | | 6/1986 | Hogenhout |
| 4,692,073 | A | | 9/1987 | Martindell |
| 4,711,457 | A | * | 12/1987 | Wezel ......................... 279/65 |
| 4,848,779 | A | | 7/1989 | Wheeler et al. |
| 4,938,191 | A | * | 7/1990 | Oldani et al. ............... 123/432 |
| 5,005,843 | A | | 4/1991 | Markle et al. |
| 5,011,344 | A | | 4/1991 | Johnson |
| 5,013,194 | A | | 5/1991 | Wienhold |
| 5,038,599 | A | | 8/1991 | Wellman |
| 5,135,241 | A | | 8/1992 | Huff et al. |
| 5,223,203 | A | | 6/1993 | Seifert et al. |
| 5,284,069 | A | | 2/1994 | Wellman |
| 5,372,770 | A | | 12/1994 | Machida |
| 5,398,946 | A | | 3/1995 | Quiring |
| 5,447,397 | A | | 9/1995 | Asano |
| 5,464,229 | A | | 11/1995 | Salpaka |
| 5,476,273 | A | | 12/1995 | Shadeck et al. |
| 5,481,949 | A | | 1/1996 | Yen |
| 5,540,527 | A | | 7/1996 | Bohnet et al. |
| 5,564,717 | A | | 10/1996 | Alberts |
| 5,573,255 | A | | 11/1996 | Salpaka |
| 5,577,743 | A | | 11/1996 | Kanaan et al. |
| 5,586,847 | A | | 12/1996 | Mattern, Jr. et al. |
| 5,662,011 | A | | 9/1997 | Habermehl |
| 5,664,634 | A | | 9/1997 | McCracken |

(List continued on next page.)

FOREIGN PATENT DOCUMENTS

| DE | 210042 | * | 4/1907 | ................. 279/57 |
| DE | 347 557 | C | 1/1922 | |
| DE | 35 10 020 | A | 9/1986 | |
| FR | 1077725 | * | 5/1954 | ................. 279/56 |
| GB | 589857 | * | 7/1974 | ................. 279/57 |

Primary Examiner—Daniel W. Howell
(74) Attorney, Agent, or Firm—Alston & Bird LLP

(57) ABSTRACT

There is provided a keyless chuck, a clutch assembly, and an associated method for releasably gripping a bit. The chuck includes a jaw assembly that is adjustable between open and closed positions, a threaded shaft in operable communication with the jaw assembly, and at least one clutch member. Each clutch member is adjustable between an engaged position and a disengaged position. In the engaged position, each clutch member threadably engages the threaded shaft, such that the threaded shaft translates axially and adjusts the jaw assembly between the open and closed positions.

33 Claims, 17 Drawing Sheets

U.S. PATENT DOCUMENTS

| | | |
|---|---|---|
| 5,678,961 A | 10/1997 | Fleege et al. |
| 5,695,305 A | 12/1997 | Heym |
| 5,704,739 A | 1/1998 | Bridenstine et al. |
| 5,709,393 A | 1/1998 | von Keudell et al. |
| 5,722,805 A | 3/1998 | Giffin |
| 5,740,586 A | 4/1998 | Gomas |
| 5,755,448 A | 5/1998 | Kanaan et al. |
| 5,807,038 A | 9/1998 | Skinner |
| 5,807,040 A | 9/1998 | Bongers-Ambrosius et al. |
| 5,817,096 A | 10/1998 | Salyer |
| 5,919,009 A | 7/1999 | Stephenson |
| 5,921,562 A | 7/1999 | Robison |
| 5,951,026 A | 9/1999 | Harman, Jr. et al. |
| RE36,558 E | 2/2000 | Moore et al. |
| 6,053,675 A | 4/2000 | Holland et al. |
| 6,079,716 A | 6/2000 | Harman, Jr. et al. |
| 6,109,145 A | 8/2000 | Habermehl |
| 6,135,462 A | 10/2000 | Robison |
| 6,156,016 A | 12/2000 | Maginot |
| 6,176,654 B1 | 1/2001 | Jore |
| 6,176,655 B1 | 1/2001 | Ostermeier et al. |
| 6,186,037 B1 | 2/2001 | Ricci et al. |
| 6,193,241 B1 | 2/2001 | Robison |
| 6,199,872 B1 | 3/2001 | Hasan |
| 6,241,260 B1 * | 6/2001 | Judge et al. .................. 279/64 |
| 6,260,857 B1 | 7/2001 | Wienhold et al. |
| 6,261,035 B1 | 7/2001 | Moores, Jr. et al. |
| 6,270,085 B1 | 8/2001 | Chen et al. |
| 6,293,559 B1 | 9/2001 | Harman, Jr. et al. |
| 6,325,393 B1 | 12/2001 | Chen et al. |
| 6,637,756 B2 * | 10/2003 | McCurry .................... 279/61 |
| 2003/0077137 A1 * | 4/2003 | Rohm .................... 408/239 R |

* cited by examiner

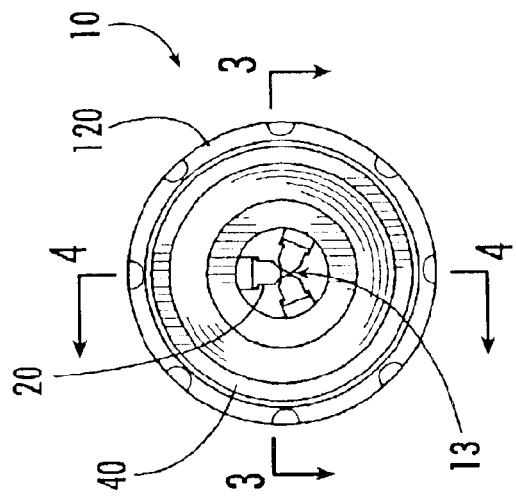
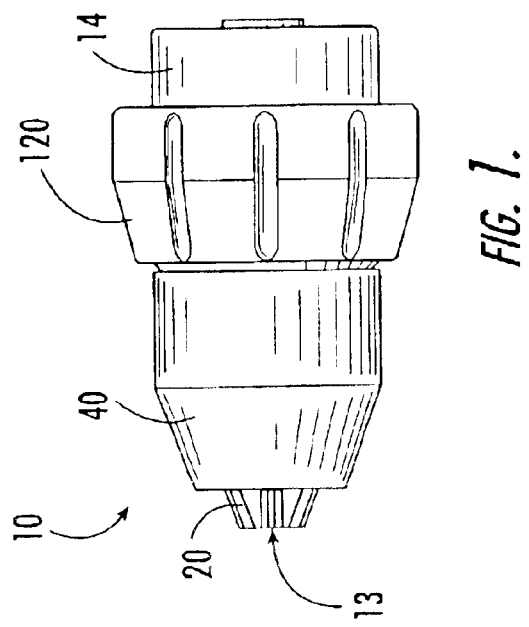

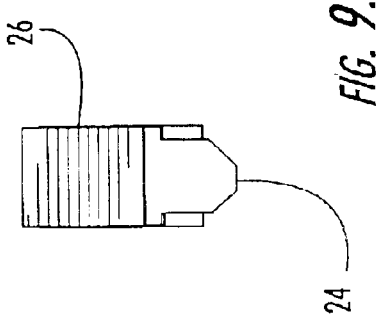
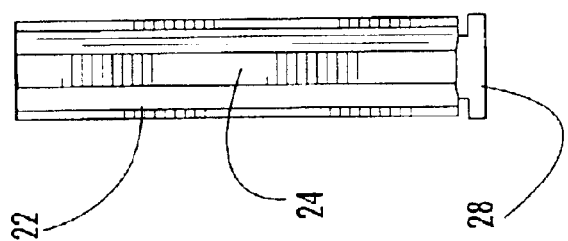
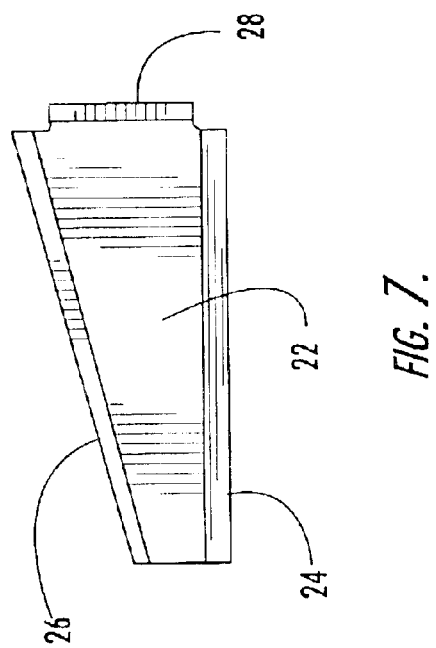
FIG. 9.
FIG. 8.
FIG. 7.

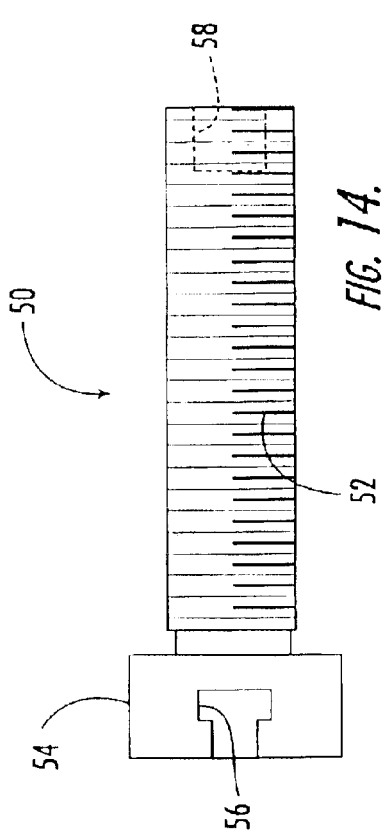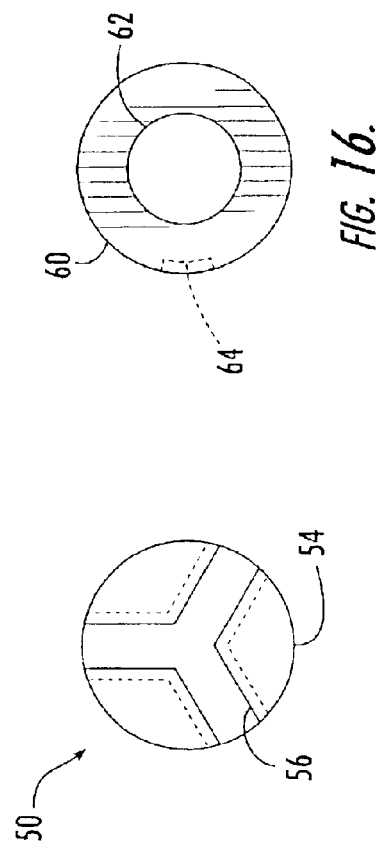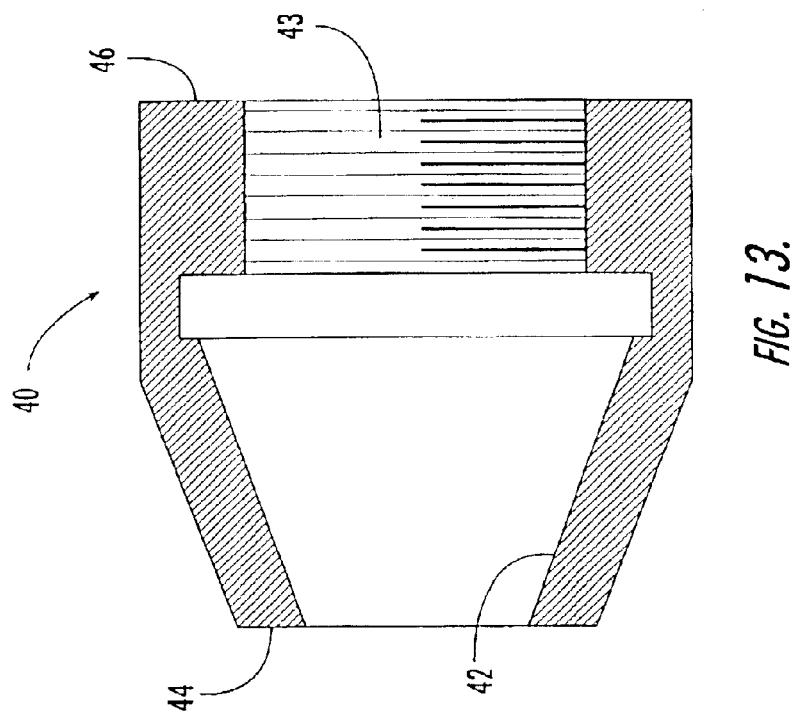
FIG. 14.
FIG. 15.
FIG. 16.
FIG. 13.

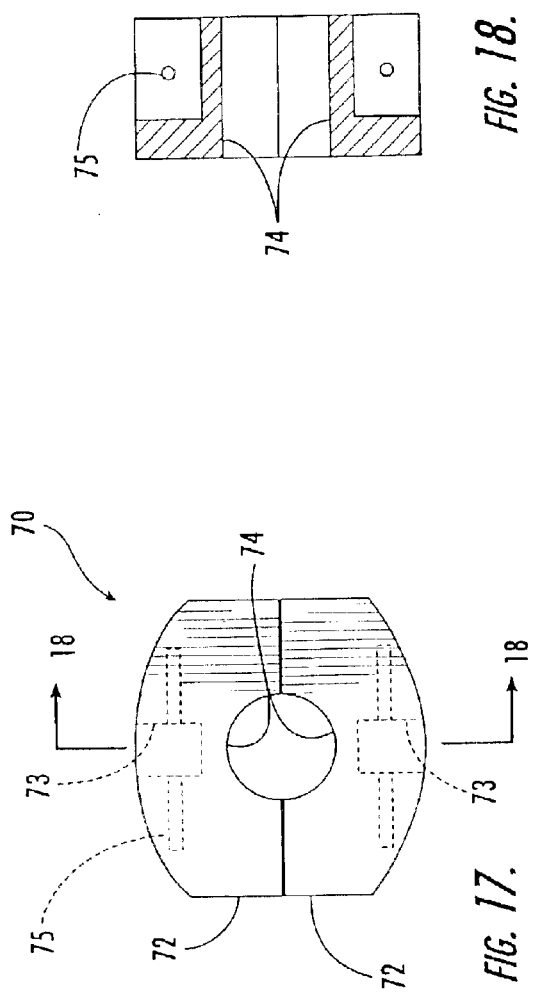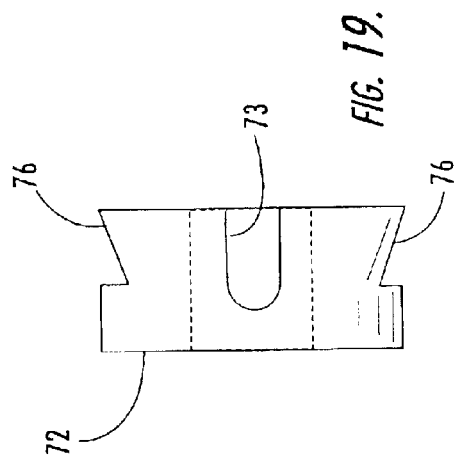

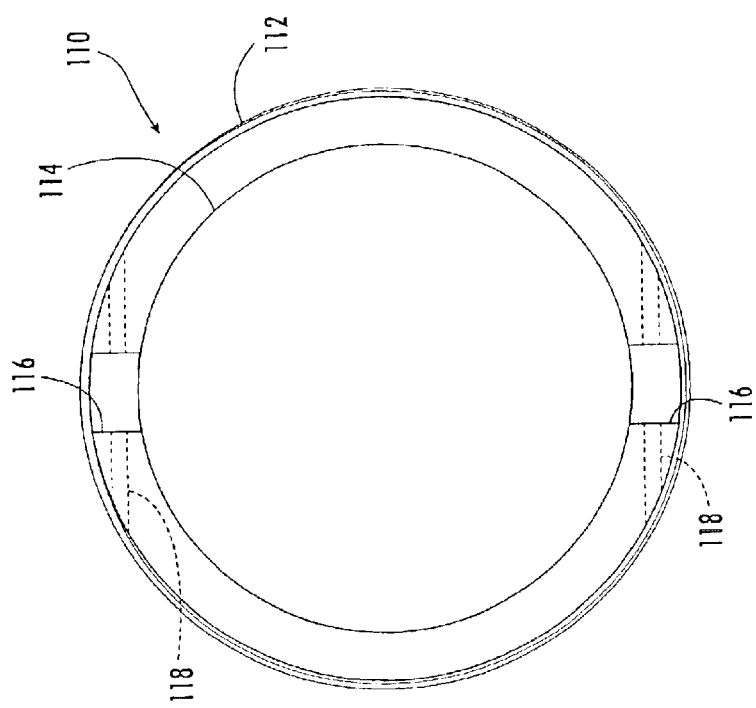
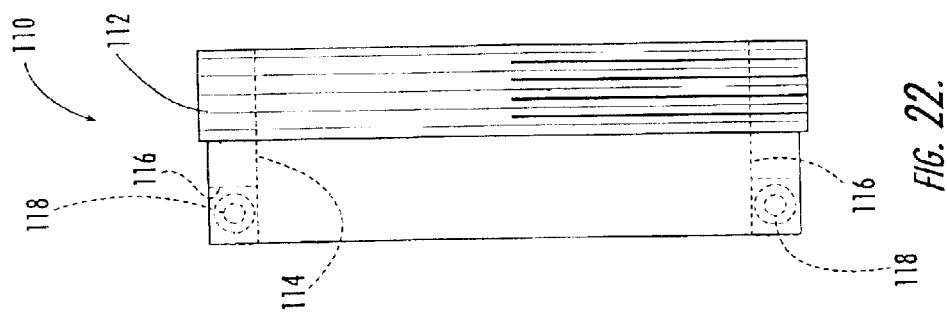

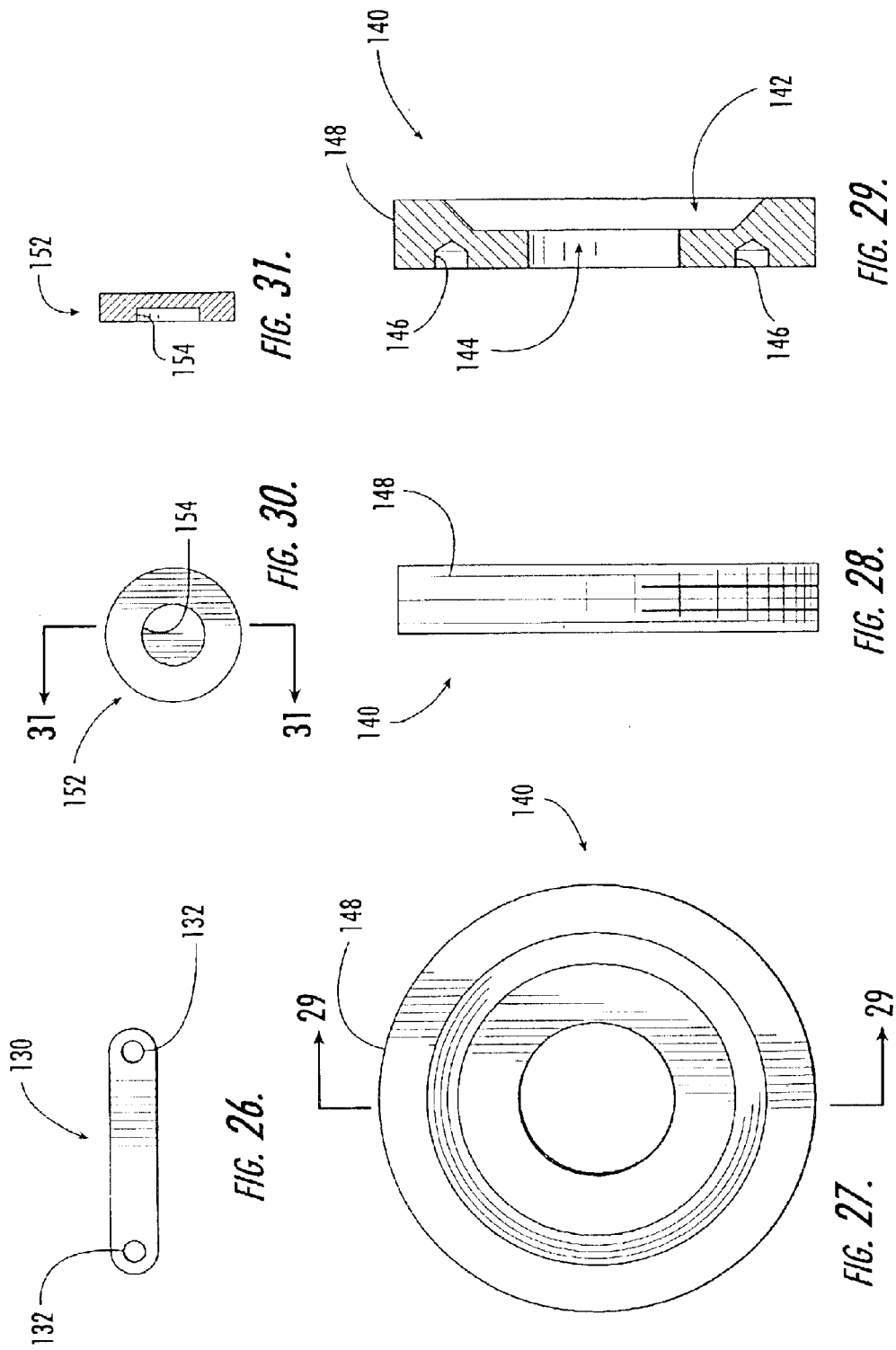

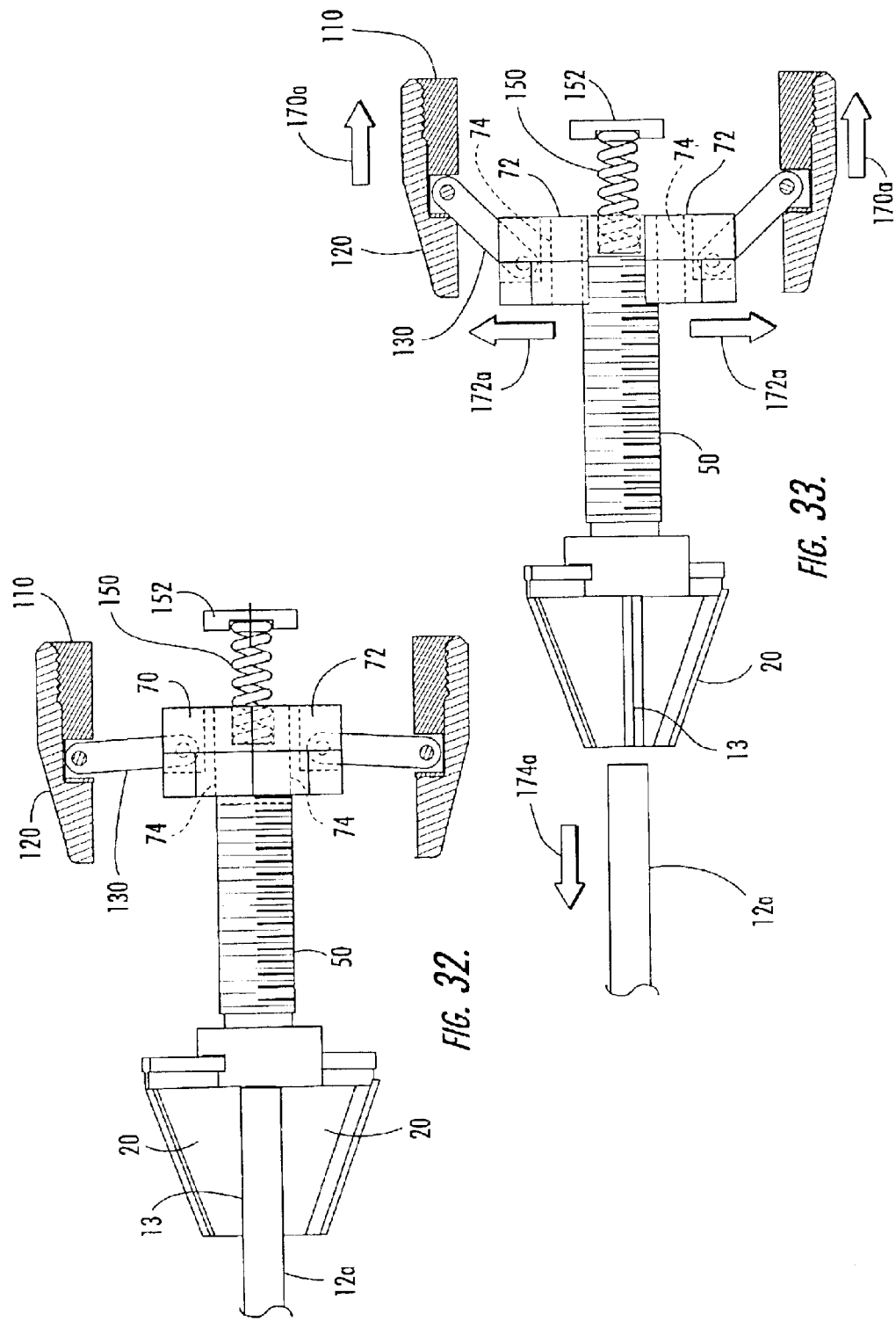

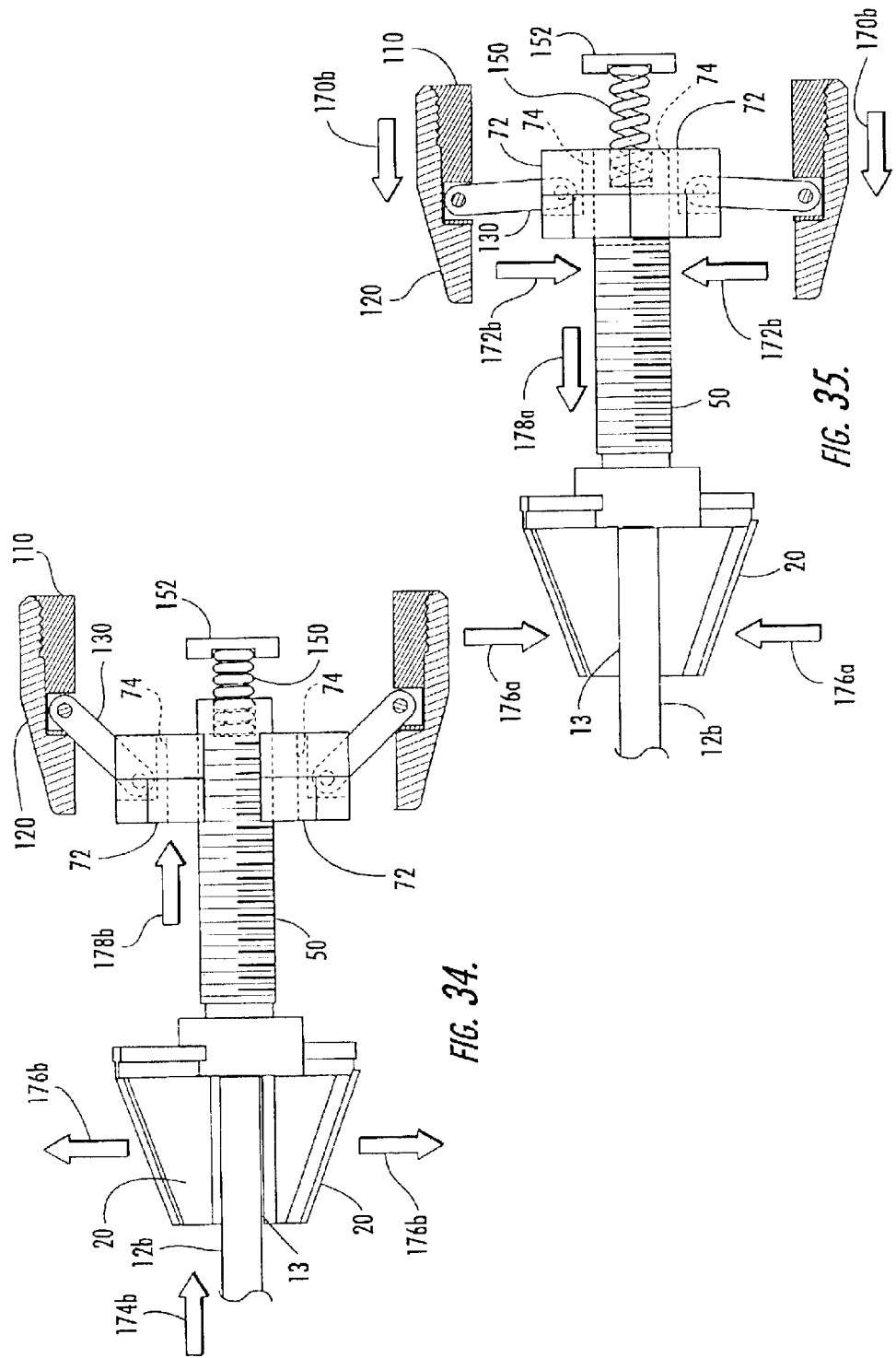

QUICK CHANGE CHUCK

BACKGROUND OF THE INVENTION

1) Field of the Invention

The present invention relates to chucks for gripping bits, such as standard shank drill bits. More particularly, the present invention relates to adjustable chucks for gripping bits such that the bits can be secured during a work process and released thereafter without the use of a key and without requiring two hands.

2) Description of Related Art

Chucks are used to secure a bit, or work tool, in a machine. For example, many drills, lathes, screwdrivers, and routers include chucks that can hold any of a number of different bits such as drill bits, screwdriving bits, router bits, and the like. For a rotational tool, such as a drill, the chuck must hold the bit in rotational communication with a handle or motor such that the bit is rotated as the handle or motor rotates. Additionally, many chucks also secure the bit axially so that the bit cannot be inadvertently removed from the chuck, for example, while backing a drill bit out of a workpiece. A variety of mechanisms for chucks are well known in the prior art. For example, a chuck can include a slot with a non-circular shape that corresponds to the bit. Alternatively, the slot can be keyed or include one or more set screws to secure the bit in the slot. Some chucks also use magnets to secure the bit.

In one typical chuck that is used with many drills, the chuck has a jaw assembly that can be adjusted between open and closed positions. The jaw assembly includes several jaws, usually three, that can be moved radially relative to a slot defined therebetween. The jaws are positioned in a housing that tapers toward a bit aperture for receiving the bit. As the jaws are advanced into the housing, each jaw is moved radially inward to close the slot, and the jaws can be biased with springs to open as the jaws are retracted from the housing. Typically, the jaws are axially advanced and retracted by a threaded shaft that engages the jaws through a shaft aperture of the housing opposite to the bit aperture. The threaded shaft engages the housing and can be screwed into or out of the housing using a special key.

The use of a key for securing and releasing a bit in a chuck can be time consuming and difficult, often requiring the use of two hands. Additionally, if the key is lost, the chuck can be difficult to adjust. Therefore, numerous proposals have been made for chucks that do not require a key to secure and release the bit. However, none of these proposed chucks has proven completely satisfactory, as evident by the continued use of keyed chucks.

A keyless chuck should be capable of securely holding a variety of bits, preferably including bits of different sizes. No tools should be required for opening and closing the chuck. An operator should be able to open or close the chuck and change the bit quickly, with minimal effort, and preferably with only one hand. Additionally, the chuck should be rugged to withstand harsh work environments, and cost-effective to manufacture and service.

BRIEF SUMMARY OF THE INVENTION

The present invention satisfies the needs of the prior art with a chuck, a clutch assembly, and an associated method for releasably gripping a bit. The chuck includes a jaw assembly that can accommodate different bits and a threaded shaft for actuating the jaw assembly. Clutch members can be adjusted without the use of tools to threadably engage a drive body to the shaft or disengage the drive body from the shaft. The clutch members can be adjusted quickly, and an operator can use a single hand to adjust the chuck and change the bit. Additionally, the chuck is cost-efficient to manufacture and rugged.

The present invention provides a keyless chuck for releasably gripping a bit, such as a standard shank drill bit. The chuck includes a jaw assembly that is adjustable between open and closed positions and a threaded shaft in operable communication with the jaw assembly, for example, in rotatable communication with said jaw assembly. According to one aspect of the present invention, the jaw assembly includes a plurality of jaws that define a slot therebetween. The jaws are radially and axially movable within a tapered housing and in sliding engagement with the housing such that the jaws move radially inward when advanced axially in the housing. Additionally, the chuck includes at least one clutch member, each of the clutch members being adjustable between an engaged position and a disengaged position. In the engaged position, each clutch member threadably engages the threaded shaft and rotation of the clutch members about the threaded shaft causes the threaded shaft to translate axially and adjust the jaw assembly between the open and closed positions. Each clutch member can be a threaded partial nut, such as a half nut. According to another aspect of the invention, each of the clutch members is slidably connected to a rotatable member to slide in a direction extending radially from the threaded shaft.

According to yet another aspect of the present invention, the clutch members are operably connected to a release handle that is located at least partially outside of a chuck body. The release handle is connected to the clutch members, for example, by linking members that are pivotally connected to the clutch members and the release handle or by a cam connection that moves the clutch members radially relative to the threaded shaft. The release handle can be slidably moveable in a direction parallel to a longitudinal axis of the threaded shaft. According to another aspect, the chuck also includes at least one spring configured to bias the jaw assembly to the closed position with the at least one clutch member in the disengaged position. The spring can be configured to bias the threaded shaft toward the jaw assembly with the at least one clutch member in the disengaged position.

The present invention also provides a clutch assembly for actuating a jaw assembly between open and closed positions. The jaw assembly can include a plurality of jaws defining a slot therebetween, and the jaws can be radially and axially movable within a tapered housing and in sliding engagement with the housing such that the jaws move radially inward when advanced axially in the housing. The clutch assembly includes a rotatable threaded shaft and a plurality of clutch members. The clutch members are adjustable in a direction radial to the shaft between engaged positions and disengaged positions. In the engaged positions, the clutch members threadably engage the shaft such that rotation of the clutch members about the shaft causes the shaft to translate axially relative to the clutch members. According to one aspect of the present invention, the threaded shaft is in operable communication with the jaw assembly such that translation of the threaded shaft causes adjustment of the jaw assembly between the open and closed positions. The threaded shaft can also be in rotatable communication with the jaw assembly.

According to another aspect of the invention, each of the clutch members is a partial nut, such as a half nut, that has threads to engage the threaded shaft. Each of the clutch members can be slidably connected to a rotatable member such that each clutch member is slidable in a direction extending radially from the threaded shaft. Further, each member can be operably connected to a release handle located at least partially outside of a chuck body. According to yet another aspect, the release handle is connected to the clutch members by at least one linking member, which is pivotally connected to one of the clutch members and the release handle. The release handle can be slidably moveable in a direction parallel to a longitudinal axis of the shaft. According to still another aspect of the invention, each of the clutch members is operably connected to the release handle by a cam connection such that adjusting the release handle moves the clutch members radially relative to the threaded shaft.

According to another aspect of the present invention, the chuck also includes at least one spring configured to bias the jaw assembly to the closed position with the at least one clutch member in the disengaged position. The spring can be configured to bias the threaded shaft toward the jaw assembly with the clutch members in the disengaged positions.

The present invention also provides a method for releasably gripping a bit. The method includes inserting the bit into a jaw assembly. At least one clutch member is threadably engaged with a threaded shaft that is in operable communication with the jaw assembly, for example, by adjusting a handle outside a chuck body to adjust the clutch members into threadable engagement with the threaded shaft. The handle can be adjusted in a direction parallel to a longitudinal axis of the threaded shaft. The clutch members can be engaged with the shaft by sliding the clutch members radially toward the threaded shaft. The method also includes rotating the at least one clutch member about the threaded shaft to axially extend the threaded shaft in communication with the jaw assembly. The jaw assembly can also be rotated. According to one aspect of the present invention, a plurality of jaws of the jaw assembly are urged into a tapered housing such that the jaws slidably engage the housing and move radially inward to grip the bit.

According to another aspect of the invention, the method also includes resisting the rotational motion of the at least one clutch member through the threaded shaft. According to yet another aspect, the method also includes disengaging the at least one clutch members from the threaded shaft. Thereafter, the jaw assembly can be biased to a closed position, for example, by biasing said threaded shaft toward said jaw assembly.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 is an elevation view of a drill chuck in a closed position with a clutch assembly in an engaged position according to one embodiment of the present invention;

FIG. 2 is a side view of the left side of the drill chuck of FIG. 1;

FIG. 7 is an elevation view of a jaw according to one embodiment of the present invention;

FIG. 8 is a bottom view of the jaw of FIG. 7;

FIG. 9 is a side view of the left side of the jaw of FIG. 7;

FIG. 13 is a section view of a tapered housing according to one embodiment of the present invention;

FIG. 14 is an elevation view of a threaded shaft according to one embodiment of the present invention;

FIG. 15 is a side view of the left side of the threaded shaft of FIG. 14;

FIG. 16 is a plan view of an alignment ring according to one embodiment of the present invention;

FIG. 17 is an elevation view of two half nuts according to one embodiment of the present invention;

FIG. 18 is a section view of the half nuts of FIG. 17 as seen along line 18—18 of FIG. 17;

FIG. 19 is a side view of the right side of the half nuts of FIG. 17;

FIG. 22 is an elevation view of a release ring according to one embodiment of the present invention;

FIG. 23 is a side view of the left side of the release ring of FIG. 22;

FIG. 26 is an elevation view of a linking member according to one embodiment of the present invention;

FIG. 27 is an elevation view of an end plate according to one embodiment of the present invention;

FIG. 28 is a side view of the left side of the end plate of FIG. 27;

FIG. 29 is a section view of the end plate of FIG. 27 as seen along line 29—29 of FIG. 27;

FIG. 30 is an elevation view of a spring cup according to one embodiment of the present invention;

FIG. 31 is a section view of the spring cup of FIG. 30 as seen along line 31—31 of FIG. 30;

FIG. 32 is a schematic view of the drill chuck of FIG. 1 in an open position with the clutch assembly in the engaged position;

FIG. 33 is a schematic view of the drill chuck of FIG. 1 in the closed position with the clutch assembly in the disengaged position;

FIG. 34 is a schematic view of the drill chuck of FIG. 1 in the open position with the clutch assembly in the disengaged position;

FIG. 35 is a schematic view of the drill chuck of FIG. 1 in the open position with the clutch assembly in the engaged position;

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 3:
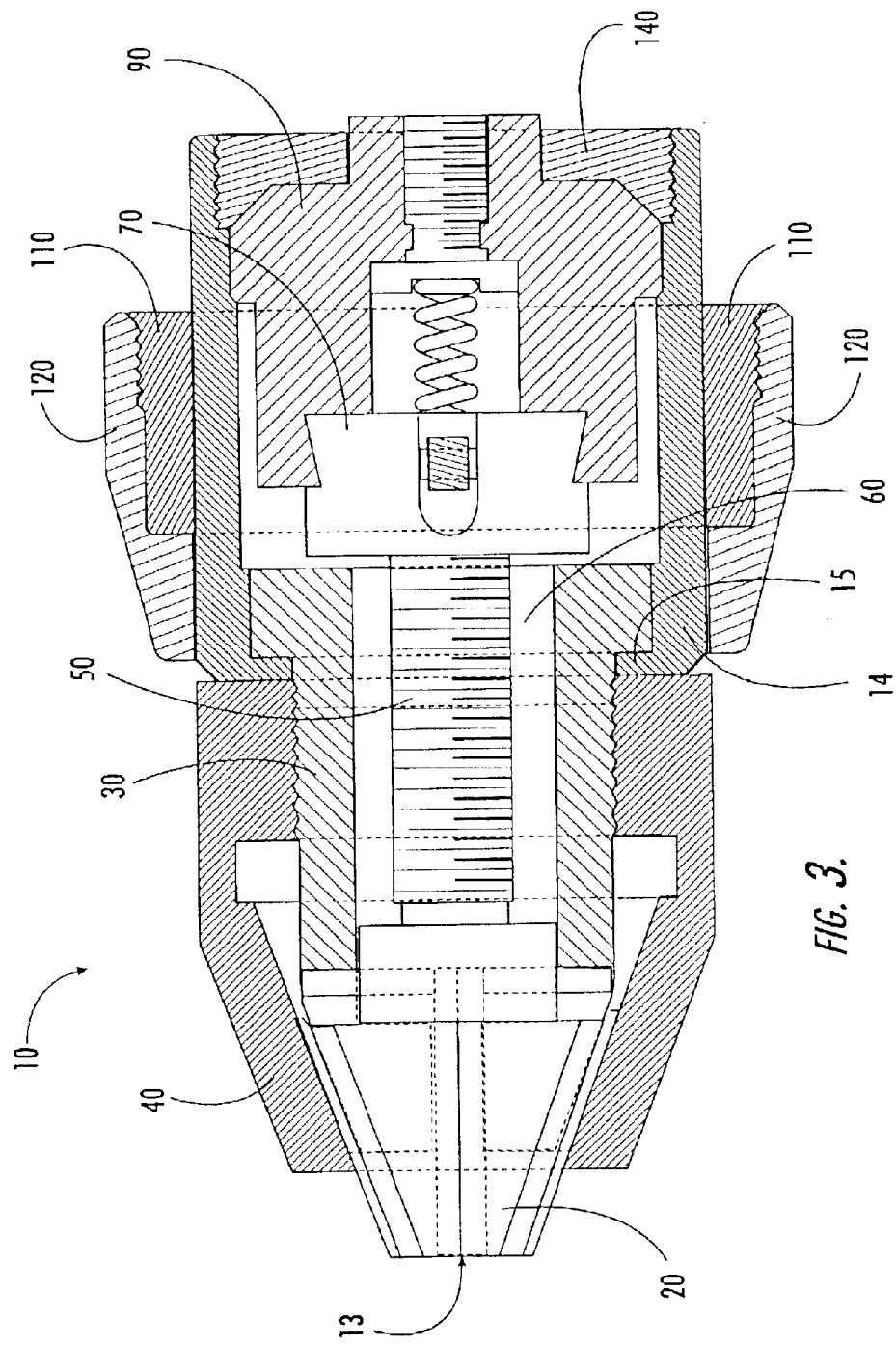
FIG. 3 is a section view of the drill chuck of FIG. 1 as seen along line 3—3 of FIG. 2.
Figure 4:
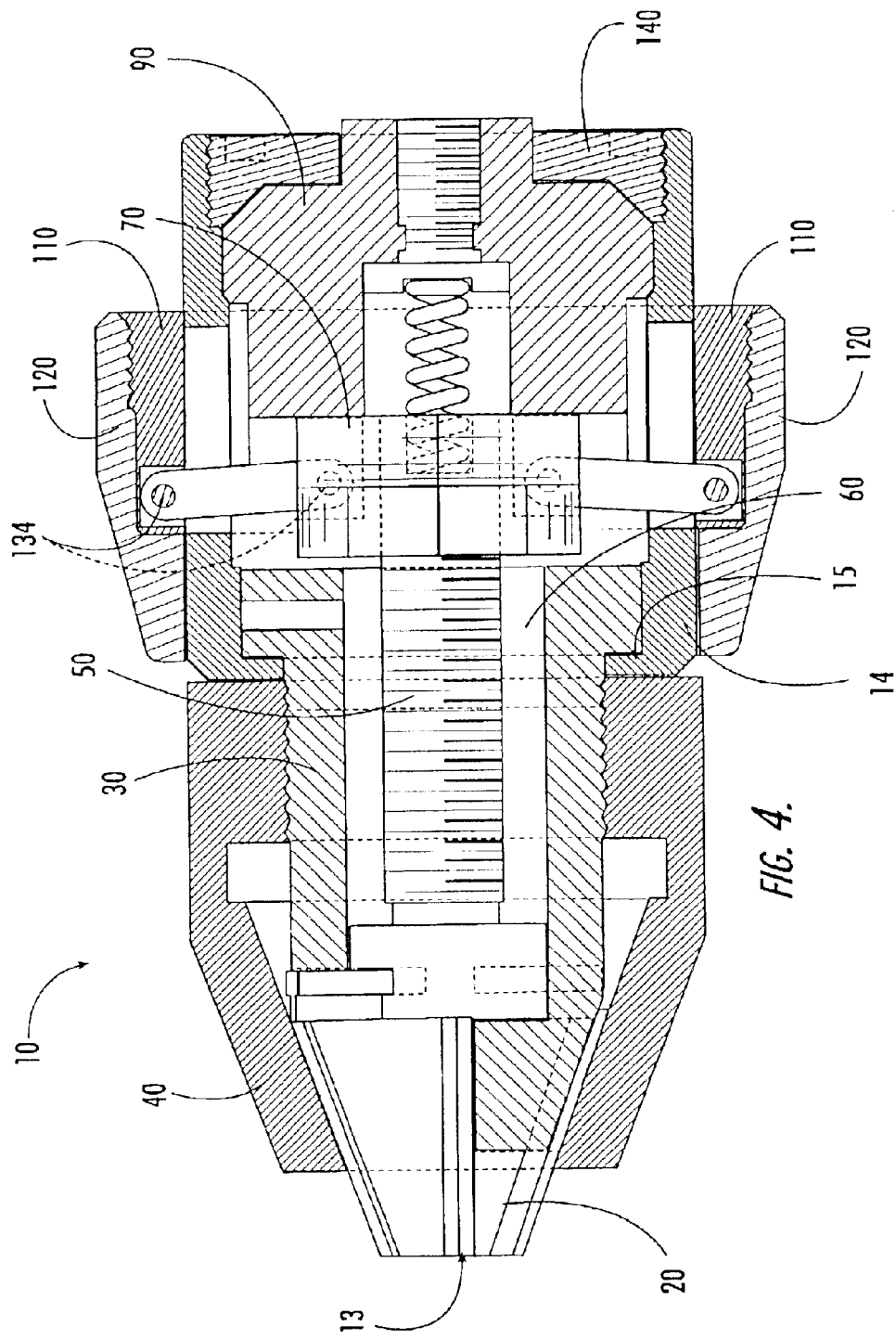
FIG. 4 is a section view of the drill chuck of FIG. 1 as seen along line 4—4 of FIG. 2.
Figure 4A:
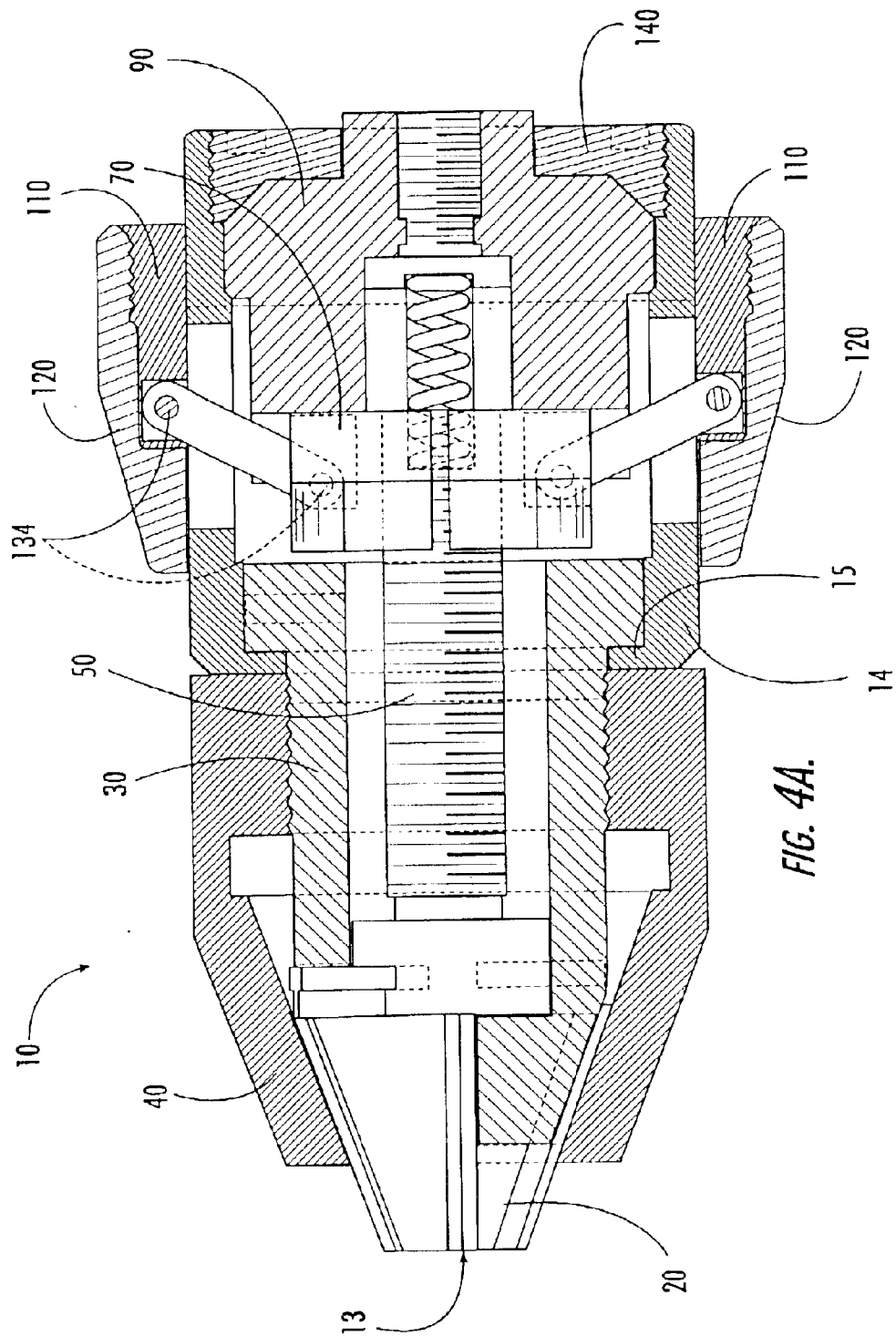
FIG. 4A is a section view of the drill chuck of FIG. 1 as shown in FIG. 4 but with the clutch assembly in a disengaged position.

A keyless drill chuck 10 according to one embodiment of the present invention is shown in FIGS. 1–4A. As shown in FIGS. 3–4A, the chuck 10 includes a jaw assembly 20 for gripping a bit (not shown), a threaded shaft 50 capable of adjusting the jaw assembly 20, a clutch assembly 70 capable of threadably engaging the threaded shaft 50, and a rotatable carrier 90 in rotatable communication with the clutch assembly 70. The carrier 90 can be attached to a rotatable drive member (not shown), which rotates the carrier 90 and the chuck 10. Each of these components will be separately described herein below.

Figure 6:
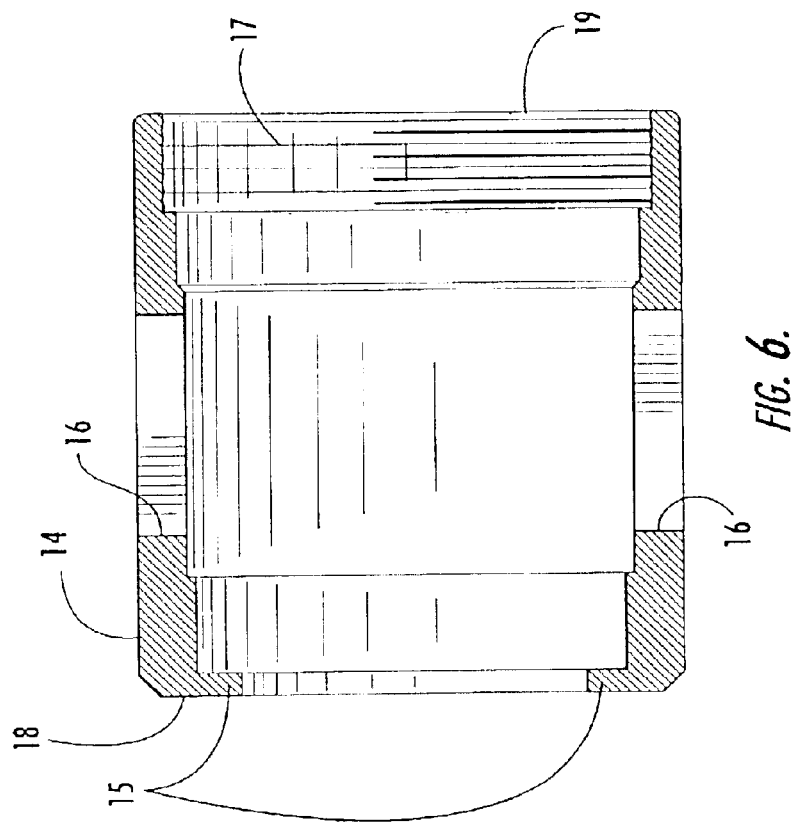
FIG. 6 is a section view of the clutch body of FIG. 5 as seen along line 6—6 of FIG. 5.
Figure 5:
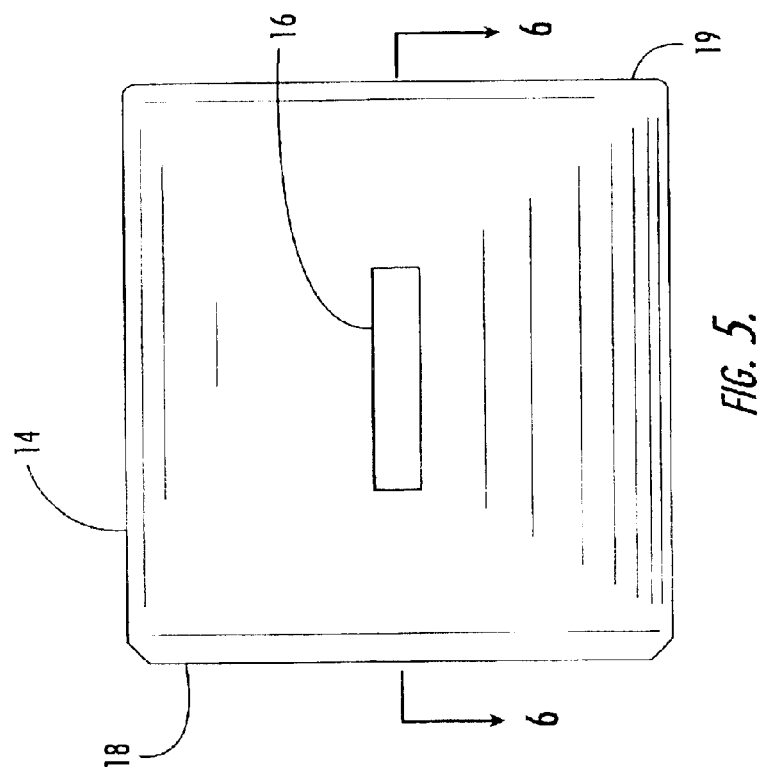
FIG. 5 is a an elevation view of a clutch body according to one embodiment of the present invention.

The clutch assembly 70, which is housed in a chuck body 14, can be adjusted between engaged and a disengaged positions. As shown in FIGS. 5 and 6, the chuck body 14 is generally cylindrical in shape and defines an interior cavity for housing the clutch assembly 70. The chuck body 14 also defines a collar 15 at a front 18 of the chuck body 14 and a threaded portion 17 at a rear 19 of the chuck body 14. Two slots 16 located on opposite sides of the chuck body 14 extend in a direction from the front 18 to the rear 19 of the chuck body 14.

Figure 11:
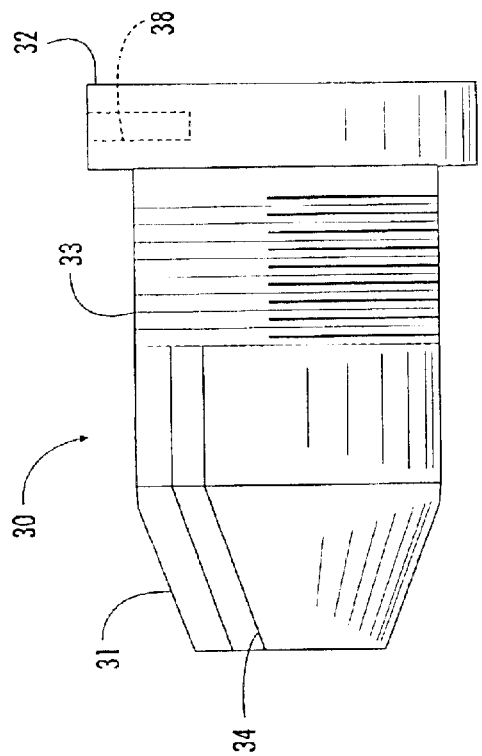
FIG. 11 is a side view of the right side of the jaw guide of FIG. 10.
Figure 12:
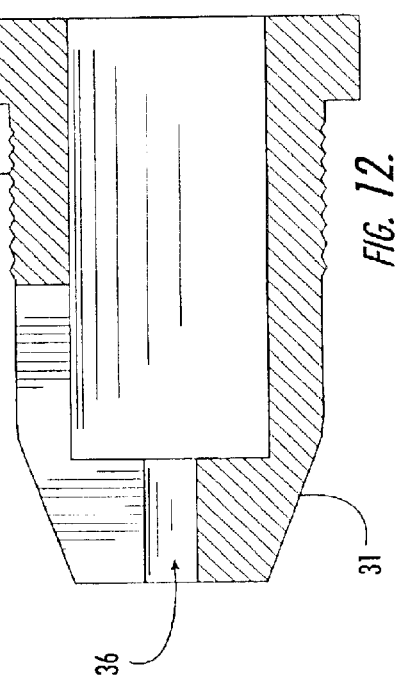
FIG. 12 is a section view of the jaw guide of FIG. 10 as seen along line 12—12 of FIG. 10.
Figure 10:
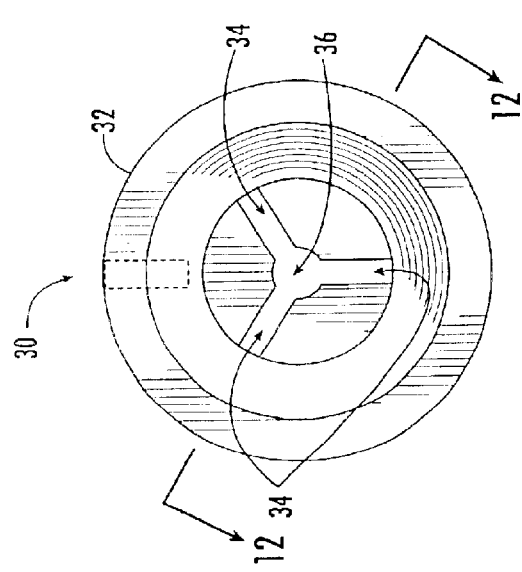
FIG. 10 is an elevation view of a jaw guide according to one embodiment of the present invention.

The jaw assembly 20, positioned adjacent to the front 18 of the chuck body 14, is adjustable between open and closed positions. In the illustrated embodiments, the jaw assembly 20 includes three jaws 22, shown individually in FIGS. 7–9, that define a bit slot 13 therebetween, though any numbers of jaws 22 can be used in accordance with the present invention. The jaws 22 are circumferentially spaced about a central axis and retained by a jaw guide 30, shown in FIGS. 10–12. Each jaw 22 defines a gripping surface 24 directed toward the slot 13 for gripping the bit. Each jaw 22 also defines an upper flange 26 and lower flange 28. The upper flange 26 of each jaw 22 extends in a direction angled relative to the gripping surface 24. Each lower flange 28 extends in a direction perpendicular to the gripping surface 24.

The jaws 22 fit in slots 34 defined by the jaw guide 30 and extending radially from a bore 36. Thus, the jaw guide 30 supports the jaws 22 so that the jaws 22 can slide axially and in a radial direction relative to the central axis of the assembly 20 between the open and closed positions. The bore 36 also receives the threaded shaft 50, which engages the jaws 22 within the jaw guide 30. The jaw guide 30 defines a threaded portion 33 and a rim 32. The rim 32 has a diameter larger than the diameter of the collar 15 of the chuck body 14. Thus, the jaw guide 30 can be inserted into the chuck body 14 so that the threaded portion 33 of the jaw guide 30 extends through the front 18 of the chuck body 14 and the rim 32 of the jaw guide 30 is retained by the collar 15 of the chuck body 14 as shown in FIGS. 3 and 4.

In the open position, the jaws 22 are slid to their outermost positions such that the bit slot 13 is widened, and in the closed position, the jaws 22 are slid to their innermost positions such that the bit slot 13 is narrowed. The closed position can be, but need not be, completely closed so that the gripping surfaces 24 of the jaws 22 make contact and close the bit slot 13. Preferably, the bit slot 13 in the closed position is smaller than a cross-sectional size of the bits that are to be gripped by the jaw assembly 20. Thus, the bit slot 13 can be closed by adjusting the jaw assembly 20 so that the gripping surfaces 24 of the jaws 22 exert a compressive force on a bit positioned in the bit slot 13 and the bit is secured therein. When the jaw assembly 20 is opened, the size of the bit slot 13 is increased to a size greater than the bit so that the bit is released from the jaw assembly 20. The range of motion between the open and closed positions of the jaw assembly 20 is preferably determined according to the size(s) of the bits that are to be secured by the jaw assembly 20 and, hence, the chuck 10.

The threaded portion 33 of the jaw guide 30 engages a correspondingly threaded portion 43 of a tapered housing 40, shown in FIG. 13, such that the front end of the jaw guide 30 and the jaws 22 are disposed in the housing 40. The tapered housing 40 has a tapered bore 42 that extends and tapers in a direction from a rear 46 of the housing 40 to a front 44 of the housing 40. Similarly, the jaw guide 30 defines a tapered portion 31 that tapers toward the front 44 of the housing 40. The tapered bore 42 of the housing 40 and the tapered portion 31 of the jaw guide 30 define a space therebetween in which the upper flanges 26 of the jaws 22 can slide. The jaws 22 are adjusted axially and radially in the jaw guide 30 and the tapered housing 40 as the threaded shaft 50 moves axially in the tapered housing 40. Thus, as the threaded shaft 50 advances the jaws 22 axially forward, i.e., in a direction toward the front 44 of the housing 40, the upper flanges 26 of the jaws 22 contact the tapered bore 42 of the tapered housing 40 which, in turn, forces the jaws 22 radially inward to close the bit slot 13. Similarly, as the threaded shaft 50 retracts the jaws 22 axially rearward, i.e., in a direction toward the rear 46 of the tapered housing 40, the upper flanges 26 of the jaws 22 contact the tapered portion 31 of the jaw guide 30 which, in turn, forces the jaws 22 radially outward to open the bit slot 13. The jaws 22 may extend axially from the front 44 or rear 46 of the tapered housing 40 when the jaws 22 are adjusted to the opened and closed positions, for example, as shown in FIG. 1.

The jaw assembly 20 is actuated by a head 54 at one end of the threaded shaft 50. The threaded shaft 50, shown individually in FIGS. 14 and 15, extends in a longitudinal direction collinear with the central axis of the jaw assembly 20, so that the head 54 extends into the bore 36 defined by the jaw guide 30. The head 54 defines T-shaped slots 56 that engage the lower flanges 28 of the jaws 22. Thus, the threaded shaft 50 is in rotatable and axial communication with the jaws 22, i.e., rotation and axial translation of the threaded shaft 50 imparts rotational and axial motion to the jaws 22. Additionally, the threaded shaft 50 is in rotational communication with the tapered housing 40 such that an operator can resist the rotation of the threaded shaft 50 by grasping the tapered housing in order to adjust the clutch assembly 70. At least a portion of the threaded shaft 50 defines threads 52 for engaging clutch members, which are described below.

An alignment ring 60, shown in FIG. 16, supports the threaded shaft 50 in alignment with the jaw assembly 20. The alignment ring 60 fits in the jaw guide 30 and is secured in place by a set screw (not shown) which engages a threaded bore 38 in the jaw guide 30 aid a set surface 64 on the alignment ring 60. The alignment ring 60 defines a bore 62 for slidably receiving the threaded shaft 50. Thus, the threaded shaft 50 can rotate relative to the alignment ring 60 and the alignment ring 60 keeps the threaded shaft 50 aligned with the jaw assembly 20. Preferably, the alignment ring 60 is formed of a low friction material or a material softer than the threaded shaft 50 such as brass.

A clutch assembly 70 is configured for engaging the threaded shaft 50 such that the threaded shaft 50 translates axially as the clutch assembly 70 rotates relative to the shaft 50. In one embodiment, the clutch assembly 70 includes at least one clutch member such as a split or partial nut. For example, FIGS. 17–19 show two half nuts 72, which can be formed by bisecting a full nut. Alternatively, the half nuts 72 can be formed independently. Any number of split nuts can be incorporated into the clutch assembly 70, and the split nuts in combination can comprise more, less, or exactly one full nut as shown in FIG. 17. In one advantageous embodiment, the clutch assembly 70 includes the two half nuts 72. Each half nut 72 defines a threaded surface 74 that corresponds to the threads 52 of the threaded shaft 50 such that when the half nuts 72 engage the threaded shaft 50 and rotate around the threaded shaft 50, the threaded shaft 50 translates axially to adjust the jaw assembly 20.

Figure 21:
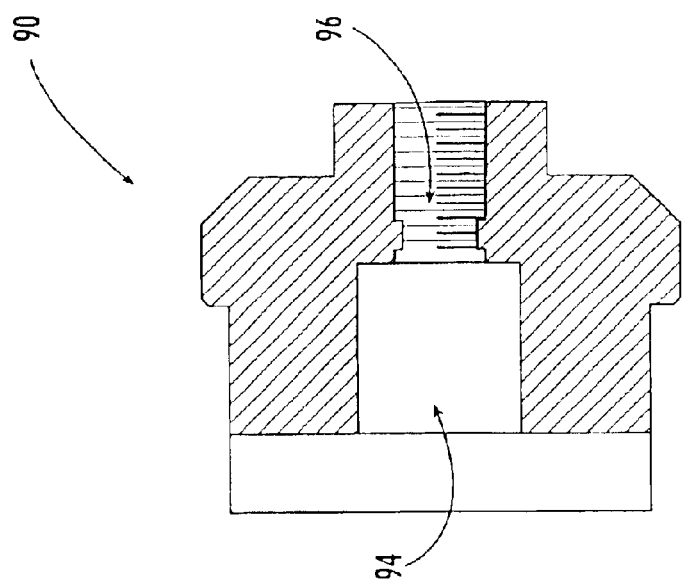
FIG. 21 is section view of the rotatable carrier of FIG. 20 as seen along line 21—21 of FIG. 20.
Figure 20:
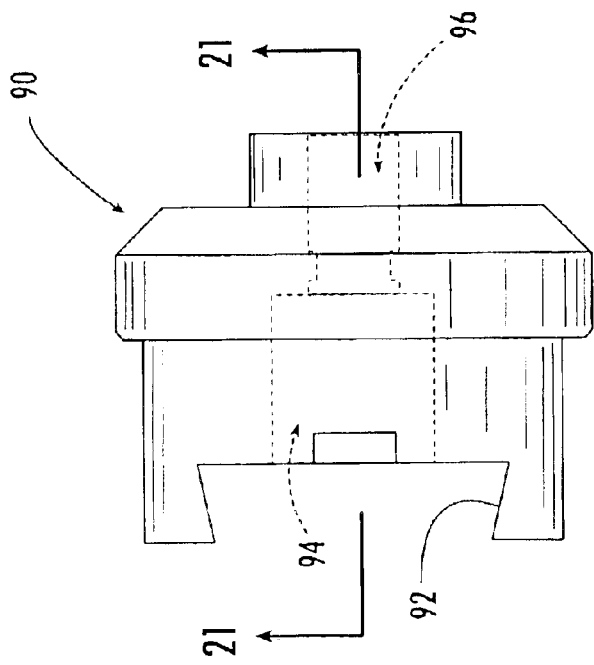
FIG. 20 is an elevation view of a rotatable carrier according to one embodiment of the present invention.
Figure 25:
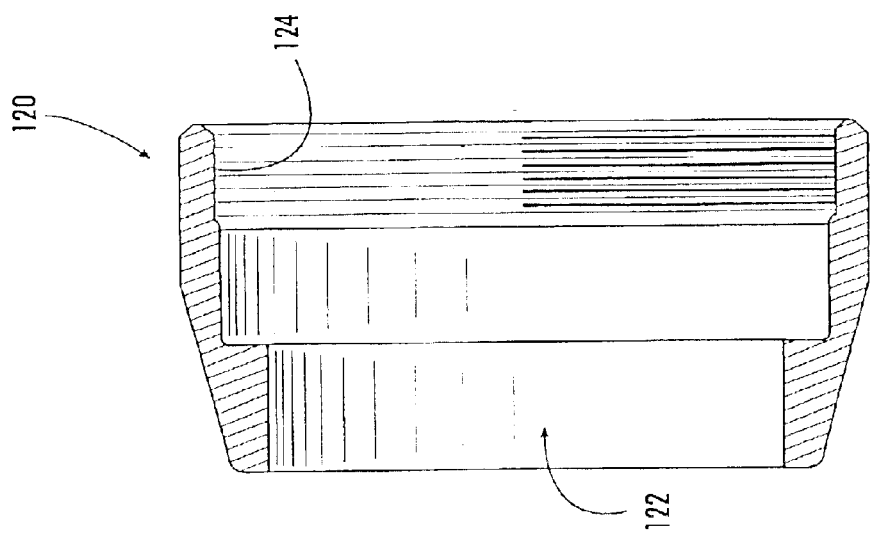
FIG. 25 is a section view of the ring sleeve of FIG. 24 as seen along line 25—25 of FIG. 24.
Figure 24:
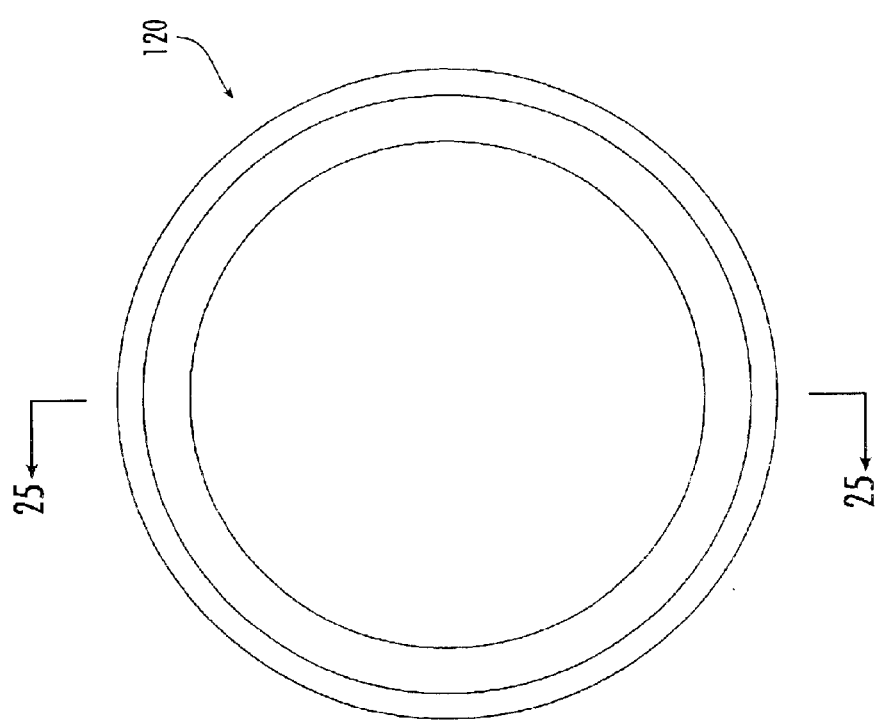
FIG. 24 is an elevation view of a ring sleeve according to one embodiment of the present invention.

The half nuts 72 are configured to move radially toward or away from the threaded shaft 50. In one embodiment, each of the half nuts 72 defines a dovetail flange 76 that corresponds to, and slides within, a radial slot 92 defined by a rotatable carrier 90. As shown in FIGS. 20 and 21, the radial slot 92 of the rotatable carrier 90 extends in a direction perpendicular to a longitudinal axis of the threaded shaft 50. The radial slot 92 is shaped to receive the dovetail flanges 76 and rotatably and axially engage the half nuts 72. Thus, the half nuts 72 rotate with the rotatable carrier 90, and the rotatable carrier 90 restrains the half nuts 72 in a direction parallel to the longitudinal axis of the threaded shaft 50, but the half nuts 72 can slide radially within the radial slot 92 of the rotatable carrier 90. The rotatable carrier 90 also defines a recess 94 located at a midpoint of the radial slot 92 for receiving an end of the threaded shaft 50 distal to the head 54. The recess 94 has a diameter larger than the threaded shaft 50, so that the threaded shaft 50 can move axially within the recess 94. The half nuts 72 are located on opposite sides of the recess 94 and the threaded shaft 50, and are configured so that the threaded surfaces 74 of the half nuts 72 face the threaded shaft 50. The half nuts 72 can slide radially inward to engage the threaded shaft 50 and radially outward to disengage the threaded shaft 50. The carrier 90 also defines a threaded bore 96 for rotatably engaging the drive member (not shown), such that as the drive member is rotated, for example, by an electric motor, the carrier 90 also rotates.

The half nuts 72 are adjusted by a handle into and out of engagement with the threaded shaft 50. The handle can be, for example, a release ring 110 and a ring sleeve 120, as shown in FIGS. 22 and 23 and FIGS. 24 and 25, respectively. The ring sleeve 120 defines a bore 122 with a threaded portion 124 which corresponds to an outer threaded portion 112 of the release ring 110, such that the ring sleeve 120 can be screwed onto the release ring 110. The release ring 110 also defines a bore 114 that corresponds to the chuck body 14, such that the release ring 110 can be fit around the chuck body 14 and the release ring 110 can slide in a direction parallel to the longitudinal axis of the threaded shaft 50.

The half nuts 72 are connected to the release ring 110 by linking members 130, which extend through the slots 16 of the chuck body 14. Each half nut 72 defines a notch 73 that receives one end of a linking member 130. Similarly, the release ring 110 defines notches 116 that receive an opposite end of each linking member 130. The linking members 130, one of which is shown in FIG. 26, define pin apertures 132 that correspond to pins 134 that pivotally connect the linking members 130 to the release ring 110 and the half nuts 72. The pins 134 also correspond to pin apertures 75 of the half nuts 72 and pin apertures 118 of the release ring 110. The pins 134 are configured to engage the pin apertures 75, 118 so that the linking members 130 are connected to the half nuts 72 and the release ring 110. For example, the pins 134 may be threaded to engage the pin apertures 75, 118 or the pins 118 may be cotter pins, spring pins, or retaining devices.

Thus, as the release ring 110 is adjusted axially forwardly or rearwardly, the half nuts 72 are radially advanced or retracted, respectively, relative to the threaded shaft 50. When the release ring 110 is adjusted axially forward, i.e., toward the jaw assembly 20, the half nuts 72 are adjusted into threadable engagement with the threaded shaft 50, thus engaging the clutch assembly 70 as shown in FIG. 4. Similarly, when the release ring 110 is adjusted axially rearward, i.e., away from the jaw assembly 20, the half nuts 72 are adjusted out of threadable engagement with the threaded shaft 50, thus disengaging the clutch assembly 70, as shown in FIG. 4A. The range of the sliding motion of the release ring 110 is limited by the range of motion of the half nuts 72 in the radial slot 92 of the carrier 90 as well as the length of the slots 16 of the chuck body 14 through which the linking members 130 extend. Additional stops (not shown) may also be provided on the chuck body 14 for limiting the range of sliding motion of the release ring 110 and/or the ring sleeve 120. Springs or a mechanical lock (not shown) can also be provided to hold the release ring 110 in place in an engaged position and/or a disengaged position so that the release ring 110 is not inadvertently adjusted.

The rotatable carrier 90 is supported by an end plate 140 which is connected to the chuck body 14 opposite the jaw assembly 20, for example, by threads 148 on the end plate 140 and the corresponding threaded portion 17 of the chuck body 14. The end plate 140 according to one embodiment of the invention is shown in FIGS. 27–29. The end plate 140 defines a recess 142 that corresponds to the shape of the rotatable carrier 90 and an aperture 144 that receives and engages the drive member. Two voids 146 on the end plate 140 are used for rotating the end plate 140 to thread the rotatable carrier 90 into the chuck body 14 during assembly and disassembly of the chuck 10.

In one advantageous embodiment of the invention, a spring 150 biases the threaded shaft 50 toward the jaw assembly 20, thus biasing the jaws 22 into the tapered housing 40 and biasing the bit slot 13 to the closed position. The spring 150 extends from a cavity 154 in a spring cup 152, which fits in the recess 94 of the rotatable carrier 90, to a recess 58 in the threaded shaft 50. The spring cup is shown individually in FIGS. 30 and 31. As the threaded shaft 50 translates axially away from the tapered housing 40, the recess 94 moves toward the spring cup 152 and the spring 150 is compressed therebetween. In one embodiment, the compressed spring 150 exerts a force of between about 2 and 5 pounds such that an operator can overcome the spring force to open the jaw assembly 20 and insert the bit into the bit slot 13.

One method of removing and securing the bit in the chuck 10 will now be explained. This method can be used by an operator of a tool such as a reversible, multi-speed drill (not shown) in order to replace a first bit 12a in the drill chuck 10 with a second bit 12b, for example, to replace a worn bit or to substitute a new bit for performing a particular task. For purposes of illustration, FIGS. 32–35 show a series of schematic views of the drill chuck 10 showing the interaction of the release ring 110, linking members 130, clutch assembly 70, threaded shaft 50, and jaw assembly 20. First, if the chuck 10 is rotating, the operator stops the chuck 10, for example, by turning off a motor or other rotational device that is in driving engagement with the drive member connected to the carrier 90 and, hence, the half nuts 72. The clutch assembly 70 in an engaged position is shown in FIG. 32. The operator then disengages the clutch assembly 70 by grasping the ring sleeve 120 and adjusting the ring sleeve 120 and the release ring 110 from an engaged position to a disengaged position. For example, in one embodiment, the operator slides the ring sleeve 120 and the release ring 110 about ½ inch in a direction parallel to the longitudinal axis of the threaded shaft 50 and directed away from the jaw assembly 20, as indicated by the arrows 170a in FIG. 33. The release ring 110, which is pivotally connected to the linking members 130, adjusts the linking members 130, which pull the half nuts 72 such that the half nuts 72 slide in the radial slots 92 radially outward, as indicated by arrows 172a, from the threaded shaft 50. The dovetail flanges 76 of the half nuts 72 slide in the radial slots 92 of the carrier 90, and the half nuts 72 slide outward from the threaded shaft 50 so that the threaded surfaces 74 of the half nuts 72 are no longer in threaded engagement with the threads 52 of the threaded shaft 50.

The spring 150, which is compressed between the threaded shaft 50 and the spring cup 152, exerts a force on the threaded shaft 50. Since the threaded shaft 50 is no longer held in place by the half nuts 72, the threaded shaft 50 is urged by this spring force toward the jaw assembly 20. The force exerted by the spring 150 holds the jaws 22 to a forward position in the tapered housing 40 and holds the gripping surfaces 24 of the jaws 22 against the bit 12a. The operator pulls the bit 12a from the bit slot 13, overcoming the frictional force between the gripping surfaces 24 of the jaws 22 and the bit 12a. The spring 150 biases the threaded shaft 50 toward the jaw assembly 20, thus moving the jaws 22 inward to the closed position to close the bit slot 13, as shown in FIG. 33.

Although the jaws 22 are biased to the closed position, the ring sleeve 120 and the release ring 110 remain in the disengaged position. To secure the second bit 12b in the chuck 10 prior to drilling, the operator inserts the bit 12b into the bit slot 13. The bit 12b can be one of a variety of types of bits including, but not limited to, drill bits, router bits, and tools for milling, screwdriving, and the like. In one embodiment, the operator urges the bit 12b against the jaws 22 in the axial direction, i.e. parallel with the longitudinal axis of the threaded shaft 50, and toward the threaded shaft 50, as indicated by arrow 174b of FIG. 34. The jaws 22 are forced rearward axially in the tapered housing 40, thereby translating the threaded shaft 50 axially and overcoming the spring force exerted by the spring 150. As the jaws 22 move axially rearward, the jaws 22 are biased radially outward by the jaw guide 30 in a direction of arrows 176b to the open position and the bit slot 13 opens. When the bit slot 13 is opened wide enough to receive the bit 12b, the bit 12b enters the bit slot 13. The operator stops exerting a force on the bit 12b and the jaw assembly 20 and the jaws 22 are closed in direction 176a about the bit 12b by the spring 150, which biases the threaded shaft 50 toward the jaw assembly 20, in a direction indicated by arrow 178a. Again, the spring 150 preferably exerts a sufficient force to hold the bit 12b in the bit slot 13 without the assistance of the operator. Thus, the operator can use a single hand to adjust the ring sleeve 120, remove the first bit 12a, and insert the second bit 12b into the chuck 10.

With the bit 12b in place, as shown in FIG. 35, the operator then grasps the ring sleeve 120 and adjusts the ring sleeve 120 and the release ring 110 from the disengaged position to the engaged position, for example, by sliding the ring sleeve 120 and the release ring 110 forward, i.e., in a direction parallel to the longitudinal axis of the threaded shaft 50 and directed toward the jaw assembly 20, in the direction indicated by arrows 170b. The release ring 110 adjusts the linking members 130 forward and radially inward, moving the half nuts 72 radially inward toward the threaded shaft 50 in the direction of arrows 172b. The dovetail flanges 76 of the half nuts 72 slide radially inward in the radial slots 92 of the carrier 90, and the half nuts 72 slide inward toward the threaded shaft 50 so that the threaded surfaces 74 of the half nuts 72 threadably engage the threads 52 of the threaded shaft 50.

The operator then tightens the chuck by rotating the clutch assembly 70 relative to the threaded shaft 50. The operator rotates the clutch assembly 70 by rotating the drive member and, hence, the carrier 90, the chuck body 14, the linking members 130, and the half nuts 72. The drive member can be rotated manually, or by actuating an electric motor of the tool that drives the driving member. For example, an electric drill typically includes an electric motor for driving the bits. In one embodiment, the operator also holds the tapered housing 40 stationary and, hence, the jaw guide 30, the jaws 22, and the threaded shaft 50 which are in rotatable communication with the tapered housing 40. The threaded surfaces 74 of the half nuts 72 engage the threads 52 of the threaded shaft 50 so that as the clutch assembly 70 rotates about the threaded shaft 50 the threaded shaft 50 is advanced axially forward in a direction indicated by arrow 178a. The axial movement of the threaded shaft 50 adjusts the jaw assembly 20 forward in the tapered housing 40, thus adjusting the jaws 22 radially inward, as indicated by arrows 176a, to close the bit slot 13 and secure the bit 12b therein between the gripping surfaces 24 of the jaws 22. When the bit 12b is secured in the bit slot 13, the jaws 22 cannot move axially inward and the threaded shaft 50 is prevented from further advancing axially. The half nuts 72 therefore cannot rotate relative to the threaded shaft 50, and the threaded shaft 50 begins to rotate with the clutch assembly 70. The operator then releases his grip on the tapered housing 40 and operates the tool as required by the task that is to be performed, i.e., by using the tool to rotate the entire chuck 10 and the bit 12b secured therein. For example, the operator can operate the tool to drill, grind, route, etc. When the task requires a different bit, or if the bit 12b becomes worn or broken, the operator can change the bit 12b using the same procedure described above.

Figure 36:
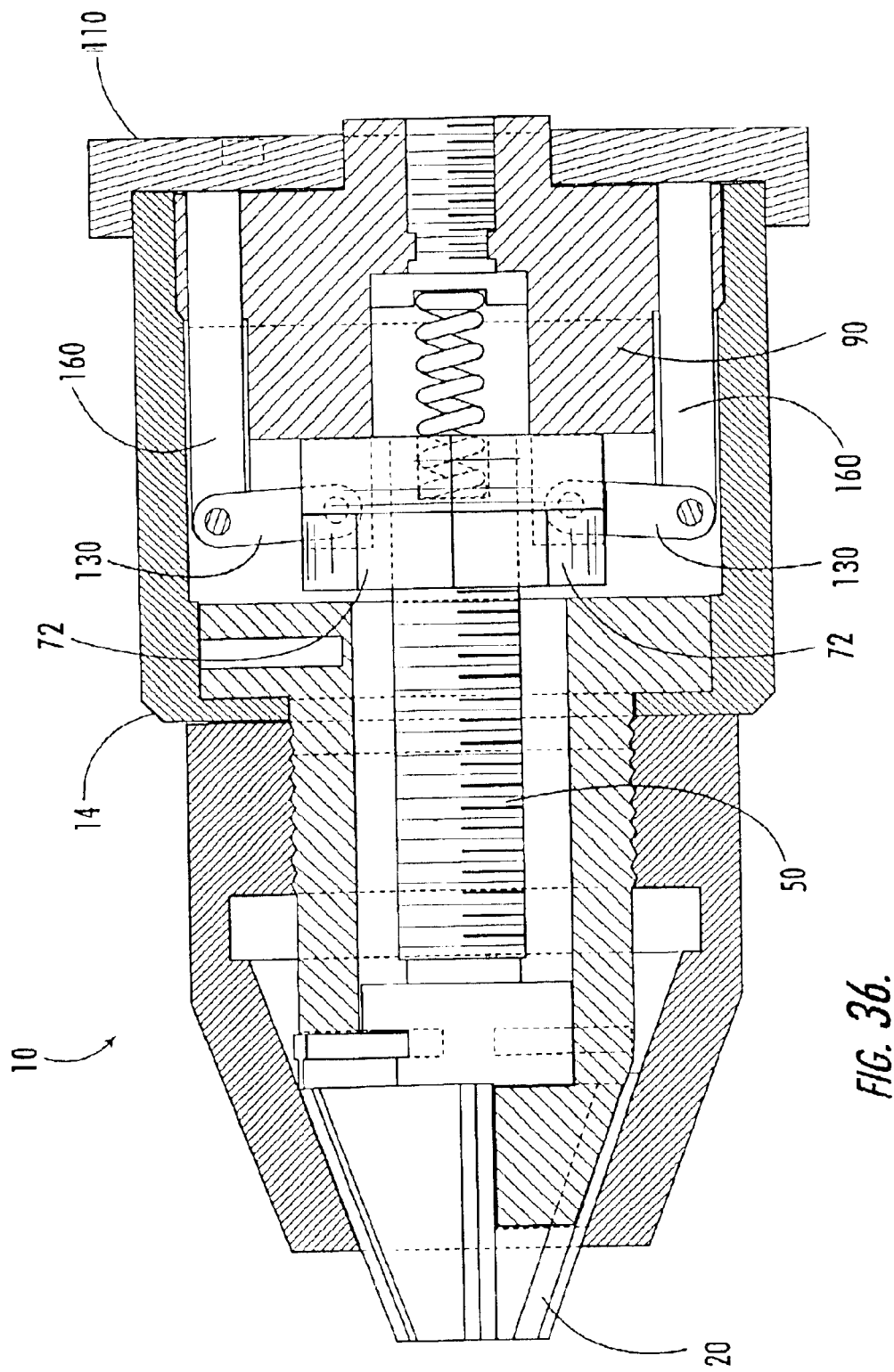
FIG. 36 is a section view of a drill chuck with a rear-mounted release handle in a closed position and a clutch assembly in an engaged position according to one embodiment of the present invention.

In an alternative embodiment of the present invention, shown in FIG. 36, the release ring 110 is positioned at the rear of the chuck body 14. Rods 160, fixedly attached to the release ring 110, extend to the linking members 130. Each linking member 130 is pivotally connected to one of the rods 160 and one of the half nuts 72, which are constrained by the carrier 90 to slide radially as described above. Thus, as the release ring 110 is adjusted axially, the rods 160 move axially and adjust the half nuts 72 radially relative to the threaded shaft 50 to engage and disengage the clutch assembly 70. For example, as the release ring 110 is adjusted rearward, i.e., in a direction away from the jaw assembly 20, the rods 160 move rearward and pull the half nuts 72 to the disengaged position away from the threaded shaft 50. Similarly, as the release ring 110 is adjusted forward, i.e., in a direction toward the jaw assembly 20, the rods 160 move forward and push the half nuts 72 to the engaged position against the threaded shaft 50.

Figure 37:
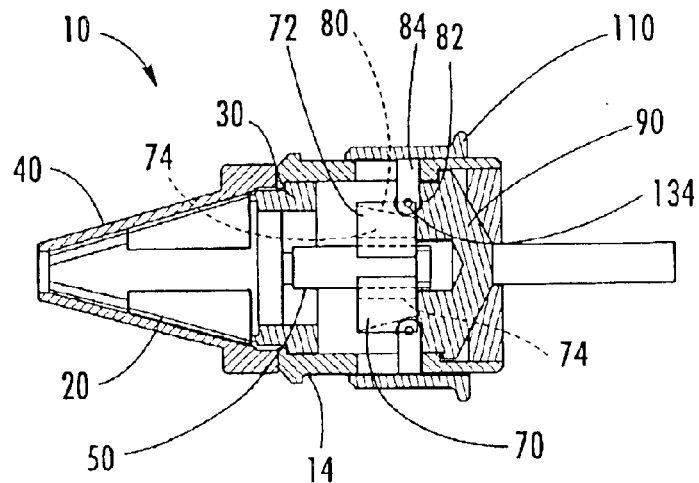
FIG. 37 is a section view an elevation view of a drill chuck with a cam clutch assembly in an engaged position according to one embodiment of the present invention.
Figure 38:
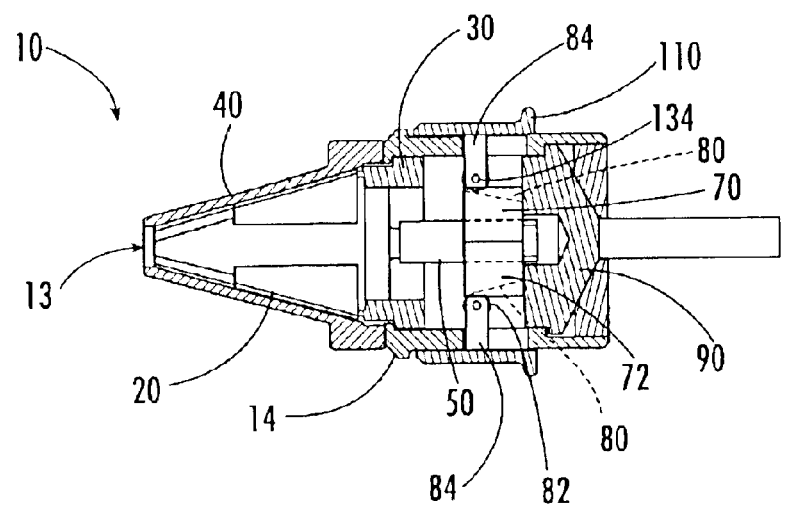
FIG. 38 is a section view of the drill chuck of FIG. 37 with the cam clutch assembly in a disengaged position.

In another embodiment of the present invention, the release ring 110 is connected to the half nuts 72 via a cam connection. As shown in FIGS. 37 and 38, arms 84 are fixedly attached to the release ring 110 and extend radially inward therefrom. A cam follower 82, such as a rotatable wheel, is connected to each arm 84 distal to the release ring 110. Each half nut 72 defines a cam surface 80 that defines the motion of the half nut 72. As the release ring 110 is adjusted axially, the arms 84 and cam followers 82 move axially. The half nuts 72 are constrained to slide radially by the carrier 90 as described above and are biased radially outward by one or more springs (not shown). Thus, as the release ring 110 is adjusted axially, the arms 84 and cam followers 82 move axially and adjust the half nuts 72 radially relative to the threaded shaft 50 to engage and disengage the clutch assembly 70. For example, as the release ring 110 is adjusted rearward, the arms 84 and the cam followers 82 move rearward. The cam surfaces 80 of the half nuts 72 are tapered such that the half nuts 72 are moved radially outward by the one or more springs to the disengaged position away from the threaded shaft 50, as shown in FIG. 37. Similarly, as the release ring 110 is adjusted forward, the arms 84 and the cam followers 82 move forward. The cam surfaces 80 of the half nuts 72 are tapered such that the cam followers 82 push the half nuts 72 to the engaged position against the threaded shaft 50, as shown in FIG. 38.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. For example, while the present invention does not require a key for tightening and loosening the jaw assembly 20, it is understood that the invention is not limited to keyless chucks and that a key can be incorporated into the chuck 10 in accordance with the invention. Also, although specific terms are employed herein, they are used in a generic and descriptive sense only and not for purposes of limitation. For example, it is understood that the half nuts 72 of the clutch assembly 70 can be "rotated" relative to the threaded shaft 50 by moving the half nuts 72 and/or the threaded shaft 50.

That which is claimed:

1. A keyless chuck for releasably gripping a bit, comprising:
    a jaw assembly adjustable between open and closed positions;
    a threaded shaft in operable communication with said jaw assembly;
    at least one clutch member adjustable between an engaged position and a disengaged position, wherein said at least one clutch member in said engaged position threadably engages said threaded shaft; and
    a spring configured to bias said threaded shaft toward said jaw assembly and thereby bias said jaw assembly to said closed position with said at least one clutch member in said disengaged position.

2. A keyless chuck according to claim 1 wherein rotation of said clutch members in said engaged position about said threaded shaft causes said threaded shaft to translate axially and adjust said jaw assembly between said open and closed positions.

3. A keyless chuck according to claim 1 wherein each clutch member comprises a threaded partial nut.

4. A keyless chuck according to claim 3 wherein each threaded partial nut is a half nut.

5. A keyless chuck according to claim 1 wherein each clutch member is slidably connected to a rotatable member such that each clutch member is slidable in a direction extending radially from said threaded shaft.

6. A keyless chuck according to claim 1 wherein each clutch member is operably connected to a release handle located at least partially outside of a chuck body.

7. A keyless chuck according to claim 6 further comprising at least one linking member, wherein each linking member connects a respective clutch member to said release handle, each linking member being pivotally connected to the respective clutch member and said release handle.

8. A keyless chuck according to claim 6 wherein said release handle is slidably adjustable in a direction parallel to a longitudinal axis of said threaded shaft between an engaged position and a disengaged position.

9. A keyless chuck according to claim 6 wherein each clutch member is operably connected to said release handle by a cam connection, such that adjusting said release handle moves said at least one clutch member radially relative to said threaded shaft.

10. A keyless chuck according to claim 1 wherein said threaded shaft extends between first and second ends, the first end being in contact with the spring and the second end being in contact with the jaw assembly.

11. A keyless chuck according to claim 1 wherein said jaw assembly comprises a plurality of jaws defining a slot therebetween, said jaws being radially and axially movable within a tapered housing and said jaws in sliding engagement with said housing such that said jaws move radially inward when advanced in a first direction in said housing, said spring biasing said threaded shaft and said jaws in the first direction.

12. A keyless chuck according to claim 1 wherein said threaded shaft is in rotatable communication with said jaw assembly.

13. A keyless chuck according to claim 1 wherein said jaw assembly comprises a plurality of jaws defining a slot therebetween, said jaws being radially and axially movable within a tapered housing and said jaws in sliding engagement with said housing such that said jaws move radially inward when advanced axially in said housing.

14. A clutch assembly for actuating a jaw assembly between open and closed positions, the clutch assembly comprising:
    a rotatable threaded shaft;
    a plurality of clutch members adjustable in a direction radial to said shaft between engaged positions and disengaged positions, wherein said clutch members in said engaged positions threadably engage said shaft such that rotation of said clutch members about said shaft causes said shaft to translate axially relative to said clutch members; and
    a plurality of jaws defining a slot therebetween, said jaws being radially and axially movable within a tapered housing;

wherein said threaded shaft is biased toward said jaws by a biasing member and configured to close the slot between said jaws when said clutch members are in the disengaged position.

15. A clutch assembly according to claim 14 wherein said threaded shaft is in operable communication with the jaw assembly such that translation of said threaded shaft causes adjustment of the jaw assembly between said open and closed positions.

16. A clutch assembly according to claim 14 wherein each clutch member comprises a partial nut, each partial nut having threads to engage said threaded shaft.

17. A clutch assembly according to claim 16 wherein each partial nut is a half nut.

18. A clutch assembly according to claim 14 wherein each clutch member is slidably connected to a rotatable member such that each clutch member is slidable in a direction extending radially from said threaded shaft.

19. A clutch assembly according to claim 14 further comprising a chuck body and wherein each clutch member is operably connected to a release handle located at least partially outside of the chuck body.

20. A clutch assembly according to claim 19 further comprising at least one linking member, wherein each linking member connects a respective clutch member to said release handle, each linking member being pivotally connected to the respective clutch member and said release handle.

21. A clutch assembly according to claim 20 wherein said release handle is slidably adjustable in a direction parallel to a longitudinal axis of said shaft between an engaged position and a disengaged position.

22. A clutch assembly according to claim 19 wherein each clutch member is operably connected to said release handle by a cam connection, such that adjusting said release handle moves said clutch members radially relative to said threaded shaft.

23. A clutch assembly according to claim 14 further comprising at least one spring configured to bias the jaw assembly to said closed position with said clutch members in said disengaged positions.

24. A clutch assembly according to claim 23 wherein said at least one spring biases said threaded shaft toward the jaw assembly with said clutch members in said disengaged positions.

25. A clutch assembly according to claim 14 wherein said threaded shaft is in rotatable communication with the jaw assembly.

26. A clutch assembly according to claim 14 wherein said jaws are radially and axially movable within a tapered housing and said jaws are in sliding engagement with said housing such that said jaws move radially inward when advanced axially in said housing.

27. A method for releasably gripping a bit, comprising;
  inserting the bit into a jaw assembly;
  threadably engaging at least one clutch member with a threaded shaft in operable communication with the jaw assembly;
  rotating the at least one clutch member about the threaded shaft to axially extend the threaded shaft in communication with the jaw assembly;
  disengaging the at least one clutch member from the threaded shaft; and
  biasing the threaded shaft toward the jaw assembly with the at least one clutch member disengaged from the threaded shaft and thereby closing the jaw assembly.

28. A method according to claim 27 further comprising resisting the rotational motion of the at least one clutch member through the threaded shaft.

29. A meted according to claim 27 wherein said engaging step comprises sliding the at least one clutch member radially toward the threaded shaft.

30. A method according to claim 27 wherein said engaging step comprises adjusting a handle outside a chuck body to adjust the at least one clutch member into threadable engagement with the threaded shaft.

31. A method according to claim 30 wherein said adjusting step comprises sliding the handle in a direction parallel to a longitudinal axis of the threaded shaft.

32. A method according to claim 27 wherein said rotating step comprises rotating said jaw assembly.

33. A method according to claim 27 wherein said rotating step comprises urging a plurality of jaws of the jaw assembly into a tapered housing such that said jaws slidably engage the housing and move radially inward to grip the bit.

* * * * *